W. TODD.
Car-Couplings.

No. 135,387.

Patented Jan. 28, 1873.

Witnesses:
D. W. Scribner.
F. E. Jordan.

Inventor:
William Todd

UNITED STATES PATENT OFFICE.

WILLIAM TODD, OF PORTLAND, MAINE.

IMPROVEMENT IN CAR-COUPLINGS.

Specification forming part of Letters Patent No. 135,387, dated January 23, 1873.

*To all whom it may concern:*

Be it known that I, WILLIAM TODD, of Portland, in the county of Cumberland and State of Maine, have invented certain new and useful Improvements on Car-Couplings, and the method of attaching them to the cars; and I hereby declare the following to be a full, clear, and exact description of the same, reference being had to the accompanying drawing, which is hereby made a part of this specification, in which—

Figure 1:
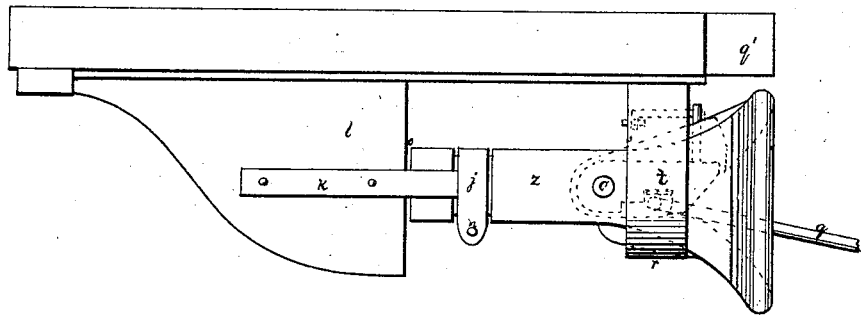
Figure 2:
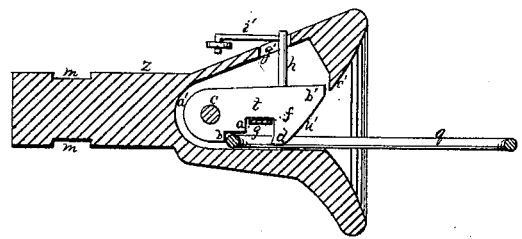
Figure 3:
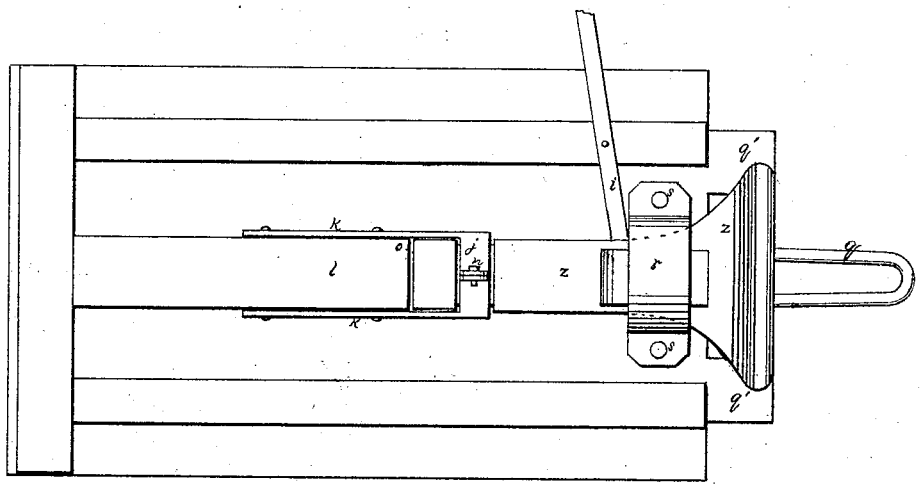

Figure 1 is a side elevation of car-coupling, showing also the method of attaching it to the car. Fig. 2 is a longitudinal vertical section of the coupling. Fig. 3 is a bottom-plan view of a coupling with a portion of the frame of the car.

Same letters show like parts.

My invention consists of certain new and useful improvements to that class of couplings which have been heretofore used with a horizontal hook placed parallel to the line of draft of the train. I wish to be understood that I do not claim the use of such hooks, broadly, but only the different improvements thereon, which I will now proceed to describe.

My invention consists in placing the plate $f$ across the chamber in the draw-bar, from side to side, passing through and filling the whole width but not the thickness of the chamber $g$ in the hook. This plate $f$ not only aids to retain the hook in its position, acting in conjunction with the pin or pivot $c$ and the projection $c'$, but, as will be seen, protects the coupling-hook $t$ from any blows of the link $q$, which would have a tendency to throw the hook upward, and thus uncouple the cars. By the use of this plate $f$ the coupling-link $q$ can never strike the hook $t$ in any way which will tend to throw it upward out of its engagement with the link, but, on the contrary, every blow which it can strike by any movement of the cars only tends to make that engagement more certain.

Upon the upper side of the draw-bar $z$ the slot $g'$ is cut, through which passes the lever $h$, which lever is firmly attached to the upper side of the coupling-hook $t$ and projects a short distance above the draw-bar $z$. This slot $g'$ is cut of sufficient length in the direction of the length of the draw-bar to permit of the necessary movement of the lever $h$ as the hook $t$ rises or falls. To this lever $h$ a link, $i'$, may be attached, to connect the lever $h$ to another lever, $i$, which may be placed, to suit the convenience of the operator, upon different kinds of cars, in different positions.

My invention further consists of a new method of attaching the draw-head to a car, and also in so combining the different parts of the draw-head and its attachments that the shock of the cars coming together will be so distributed that no one of the devices will receive an undue share of the blow.

Upon the upper and lower sides of the draw-bar I make the recesses $m\ m$. These recesses $m\ m$ are cut of a depth sufficient to contain the collar $j$, which surrounds the draw-bar $z$, and is open upon the under side, where it is secured by the screw-bolt $n$, or by a bolt and nut. The recesses $m\ m$ are made longer than the width of the strap or collar $j$ so as to permit the draw-bar to move backward and forward in the direction of its length. Backward from the collar $l$ pass the straps K K, which are firmly bolted to the block $l$. At the point $o$, where the end of the draw-bar impinges against the block $l$, a small plate, of rubber or other elastic substance, may be placed so that it will to some extent modify the blow of the draw-bar as it strikes the block $l$. The division in the collar is for the purpose of permitting the draw-bar to be removed when desired, as by unscrewing the bolt $n$ the collar $j$ may be very readily expanded over the recesses $m\ m$; and as this collar $j$ with the straps K K constitutes the only attachment of the draw-head to the car it can then be very readily removed.

The length of the draw-bar, the position of the block $l$, the buffers $q'\ q'$, the chambers $a$ and $b$ in the hook, and the link $q$ are so arranged in reference to their relative length that the shock of the next car when it reaches the one bearing these devices is equally distributed between them, so that no part bears any disproportionate strain, and thus the necessity of springs to meet such shock is entirely obviated.

The stirrup $r$, firmly bolted at $s$ to the bottom of the car, sustains the weight of the outer end of the draw-bar, but is made sufficiently large, so that when the draw-bar is disengaged from the collar $j$ the said draw-bar can be readily drawn out through the stirrup $r$ and entirely free from the car.

The operation of a draw-bar having my improvements is as follows: The hook $t$ is raised in coupling by the pressure of the end of the link $q$ upon the curved end $u'$ of the hook $t$, and the link, passing under the beak $d$, allows the hook $t$ to drop down again, and thus the cars are coupled. The projection $c'$ renders the hook $t$ entirely safe from being wrenched out from its position, and the plate $f$ guards the hook from any blow of the link which would tend to throw it up and out of its engagement with the hook $t$; for, in case the link $q$ strikes in either of the chambers $a$ or $b$, as will be seen, it forces the beak $d$ of the hook downward. The recesses $m$ $m$, collar $j$, straps K, and block $l$ divide the impact of the train between them, as described, so that no one part is unduly strained, and all danger of the breaking of these parts is obviated. To uncouple the cars the lever $i$, being pressed upon in the proper direction, raises the hook $t$ above the link $q$, and the cars are uncoupled.

I am aware of the patents granted to Wheeler and Chase October 19, 1869; and R. A. Cowell, March 5, 1867; and the rejected application of Breeden and Parrott filed December 5, 1870; and claim none of the devices therein described.

What I claim as my invention, and desire to secure by Letters Patent, is—

1. The plate $f$, when used in a car-coupling having a horizontal hook, in the manner and for the purposes as set forth.

2. The combination of the draw-head having the recesses $m$ $m$, the straps K K, collar $j$, block $l$, and buffers $q'$ $q'$, as set forth.

WILLIAM TODD.

Witnesses:
    D. W. SCRIBNER,
    C. WAY.